US012270982B1

(12) United States Patent
Zhu et al.

(10) Patent No.: US 12,270,982 B1
(45) Date of Patent: Apr. 8, 2025

(54) METHOD, DEVICE AND COMPUTER-READABLE STORAGE MEDIUM FOR OBTAINING COMPLEX REFRACTIVE INDEX DISTRIBUTION PROFILE OF FILM

(71) Applicant: HUAZHONG UNIVERSITY OF SCIENCE AND TECHNOLOGY, Hubei (CN)

(72) Inventors: Jinlong Zhu, Hubei (CN); Zhe Yu, Hubei (CN); Wenyu Chen, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 0 days.

(21) Appl. No.: 18/906,132

(22) Filed: Oct. 3, 2024

Related U.S. Application Data

(63) Continuation of application No. PCT/CN2023/132594, filed on Nov. 20, 2023.

(30) Foreign Application Priority Data

Nov. 6, 2023 (CN) ......................... 202311474098.X

(51) Int. Cl.
*G02B 21/36* (2006.01)
*G02B 21/06* (2006.01)
*G02B 21/26* (2006.01)

(52) U.S. Cl.
CPC ........... *G02B 21/365* (2013.01); *G02B 21/06* (2013.01); *G02B 21/26* (2013.01); *G02B 21/361* (2013.01)

(58) Field of Classification Search
CPC ...... G02B 21/365; G02B 21/06; G02B 21/26; G02B 21/361

(Continued)

(56) References Cited

U.S. PATENT DOCUMENTS 5,390,023 A 2/1995 Biegen
6,692,894 B1 * 2/2004 Nakano ..................... G03F 7/11
430/273.1

(Continued)

FOREIGN PATENT DOCUMENTS

| CN | 104111235 | 10/2014 |
| CN | 109141224 | 1/2019 |
| CN | 115930830 | 4/2023 |

OTHER PUBLICATIONS

Li, Ji-Xin et al., "The Development of Measurement and Calculation Model of the Medium Complex—refractive Index", Energy Conservation Technology, May 2017, with English abstract, pp. 214-219, vol. 35, No. 203.

(Continued)

*Primary Examiner* — Allen C Wong
(74) *Attorney, Agent, or Firm* — JCIPRNET

(57) ABSTRACT

The invention discloses a method for obtaining the complex refractive index distribution profile of a film. S101, the interference image of the reference area and the sample under test is collected; S102, the normalized light intensity map and the optical path difference of the sample under test relative to the reference area is determined through the recovery algorithm based on the obtained interference image; S103, the measurement model is established based on the reflective film transmission matrix model; S104, the relationship between the measured reflection coefficient and optical path difference of the area under test of the sample under test relative to the reference area and the measurement model is determined; S105, the complex refractive index distribution profile of the film under test is calculated based on the measured reflection coefficient and optical path difference of the area under test of the film relative to the reference area and the relationship.

9 Claims, 5 Drawing Sheets

(58) Field of Classification Search
USPC .......................................................... 348/79
See application file for complete search history.

(56) References Cited

U.S. PATENT DOCUMENTS

2019/0101373 A1    4/2019  Ghim et al.
2023/0011226 A1*   1/2023  Ono ................... G01N 21/9501

OTHER PUBLICATIONS

"International Search Report (Form PCT/ISA/210) of PCT/CN2023/132594," mailed on Aug. 1, 2024, pp. 1-4.
"Written Opinion of the International Searching Authority (Form PCT/ISA/237) of PCT/CN2023/132594," mailed on Aug. 1, 2024, with English translation thereof, pp. 1-10.

* cited by examiner

METHOD, DEVICE AND COMPUTER-READABLE STORAGE MEDIUM FOR OBTAINING COMPLEX REFRACTIVE INDEX DISTRIBUTION PROFILE OF FILM

CROSS-REFERENCE TO RELATED APPLICATION

This application is a continuation of International Patent Application of PCT application serial No. PCT/CN2023/132594, filed on Nov. 20, 2023, which claims the benefit of priority from China Application No. 202311474098.X, filed on Nov. 6, 2023. The entirety of each of the above mentioned patent applications is hereby incorporated by reference herein and made a part of this specification.

TECHNICAL FIELD

The invention belongs to the technical field related to optical complex refractive index measurement, and more specifically, relates to a method and device for obtaining the complex refractive index distribution profile of a film.

BACKGROUND

Nowadays, the measurement of refractive index of optical materials has become increasingly important for industries related to optics, new energy and integrated circuits and the like. As the related industries have imposed higher requirement on manufacturing of optical films, there is now widespread application and in-depth research of refractive index measurement for optical materials.

The optical phase measurement method generally has the advantages of non-destructive measurement, high measurement efficiency and high lateral resolution. However, due to the influence of the multiple reflections and extinction coefficient of absorbing materials, optical phase measurement is not suitable for material complex refractive index measurement under all conditions.

SUMMARY

In view of the above defects or needs of improvement for the related art, the present invention provides a method and device for obtaining the complex refractive index distribution profile of a film, which is provided to solve the limitations of the related art regarding film interference and the extinction coefficient of absorbing materials.

In order to achieve the above purpose, according to one aspect of the present invention, a method for obtaining the complex refractive index distribution profile of a film is provided. The obtaining method includes the following steps:

S101, collecting the interference image of the reference area and the sample under test;
S102, determining the normalized light intensity map and the optical path difference of the sample under test relative to the reference area through the recovery algorithm based on the obtained interference image;
S103, establishing the measurement model based on the reflective film transmission matrix model;
S104, determining the relationship between the measured reflection coefficient and optical path difference of the area under test of the sample under test relative to the reference area and the measurement model;
S105, calculating the complex refractive index distribution profile of the film under test based on the measured reflection coefficient and optical path difference of the area under test of the film relative to the reference area and the relationship.

Additionally, the method of collecting the interference image of the sample under test is to collect the image sequence of the sample under test in real time based on the optical path system, or to invoke from a storage medium that stores the image sequence of the sample under test collected based on the optical path system.

Also, the optical path system includes a white light source, a filter, a first lens, a field diaphragm, an aperture diaphragm, a second lens and a beam splitter arranged sequentially along the optical path. The optical path system further includes a microscope objective lens and an electric displacement stage. The microscope objective lens is disposed between the beam splitter and the electric displacement stage; the optical path system further includes a tube lens and a wavefront sensor, the tube lens is disposed between the beam splitter and the wavefront sensor.

Further, the electric displacement stage is configured to drive the sample under test to move in the horizontal or vertical direction.

Moreover, the formula corresponding to the relationship is:

$$\frac{\underline{r}}{\underline{r_0}} = \sqrt{R}\,e^{-i\varphi},$$

In the formula, R and φ respectively represent the measured ratio of reflection coefficient and optical path difference of the area under test relative to the reference area, $\underline{r}$ is the complex reflectance of the area under test, and $\underline{r_0}$ is the complex reflectance of the taken reference area.

Furthermore, the boundary a and the boundary b represent the boundaries between the film and the incident medium and substrate respectively; as the incidence is vertical, the relationship between the electric field Ea at the boundary a, the magnetic field Ha and the electric field Eb at the boundary b is:

$$\begin{bmatrix} E_a/E_b \\ H_a/E_b \end{bmatrix} = \begin{bmatrix} B \\ C \end{bmatrix} = \left\{\prod_{r=1}^{q} M_r\right\} \begin{bmatrix} 1 \\ \eta_m \end{bmatrix}$$

$$M_r = \begin{bmatrix} \cos\underline{\delta_r} & (i\sin\underline{\delta_r})/\underline{\eta_r} \\ i\underline{\eta_r}\sin\underline{\delta_r} & \cos\underline{\delta_r} \end{bmatrix}$$

$$\underline{\delta_r} = \frac{2\pi \underline{n_r} d_r}{\lambda}$$

$$\underline{\eta_r} = y_0 \underline{n_r}$$

In the formula, $\underline{n_r}$, $y_0$ and $M_r$ respectively represent the complex refractive index, optical admittance and film-related characteristic matrix, q is provided to represent the number of layers of the film, and m represents the substrate.

Moreover, the multi-layer film structure is regarded as a single-layer surface, and the admittance y is obtained, which represents the ratio of the magnetic field and the electric field. The expression is:

$$y = \frac{C}{B}$$

Then the expression of the complex reflection coefficient is:

$$\underline{r} = \frac{\eta_0 - y}{\eta_0 + y}.$$

The present invention further provides a method and system for obtaining a complex refractive index distribution profile of a film. The system includes a memory and a processor. The memory stores a computer program. When the processor executes the computer program, the method for obtaining the complex refractive index distribution profile of the film as described above is executed.

The present invention further provides a computer-readable storage medium. The computer-readable storage medium is configured to store computer-readable programs or instructions. When the programs or instructions are executed by the processor, the method for obtaining the complex refractive index distribution profile of the film as described above is implemented.

Generally speaking, by comparing the existing technology with the above technical solutions conceived by the present invention, the method and device for obtaining the complex refractive index distribution profile of film provided by the present invention mainly have the following advantageous effects:
1. After obtaining the original phase and light intensity distribution, the present invention first obtains the initial complex refractive index distribution based on a model of the reflective film transmission matrix model, obtains the target complex refractive index distribution profile model, and then removes outliers in the model, thereby increasing the accuracy of the obtained target complex refractive index distribution, that is, it is possible to restore the complex refractive index distribution of the measured sample to the greatest extent.
2. The acquisition method is simple, easy to implement and has good flexibility.
3. The present invention determines the relationship between the measurement result and the model of the reflective film transmission matrix model, and the complex refractive index distribution profile of the sample of film under test may be obtained based on the formula corresponding to the relationship and the measurement result.

DETAILED DESCRIPTION OF DISCLOSURED EMBODIMENTS

In order to make the purpose, technical solutions and advantages of the present invention more clear, the present invention will be further described in detail below with reference to the accompanying drawings and embodiments. It should be understood that the specific embodiments described here are only used to explain the present invention and are not intended to limit the present invention. In addition, the technical features involved in the various embodiments of the present invention described below can be combined with each other as long as they do not conflict with each other.

Figure 1:
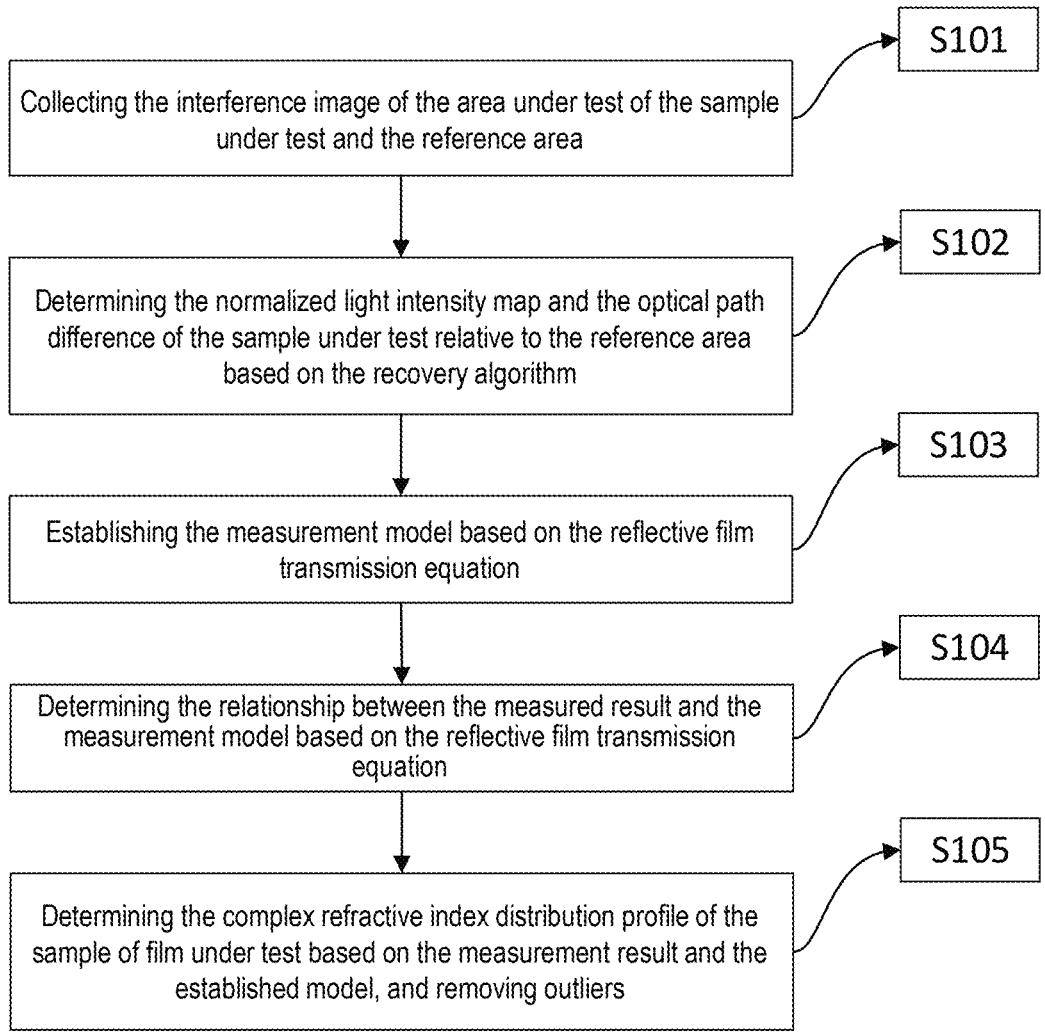
FIG. 1 is a flow chart of a method for obtaining a complex refractive index distribution profile of a film provided by the present invention.

Please refer to FIG. 1. The present invention provides a method for obtaining the complex refractive index distribution profile of a film. The obtaining method mainly includes the following steps:

In S101, the interference image of the reference area and the sample under test 19 are collected.

In step S101, the method of collecting the interference image of the sample under test 19 may be collecting the image sequence of the sample under test 19 in real time based on the optical path system, or invoking from a storage medium that stores the image sequence of the sample under test collected based on the optical path system.

Figure 2:
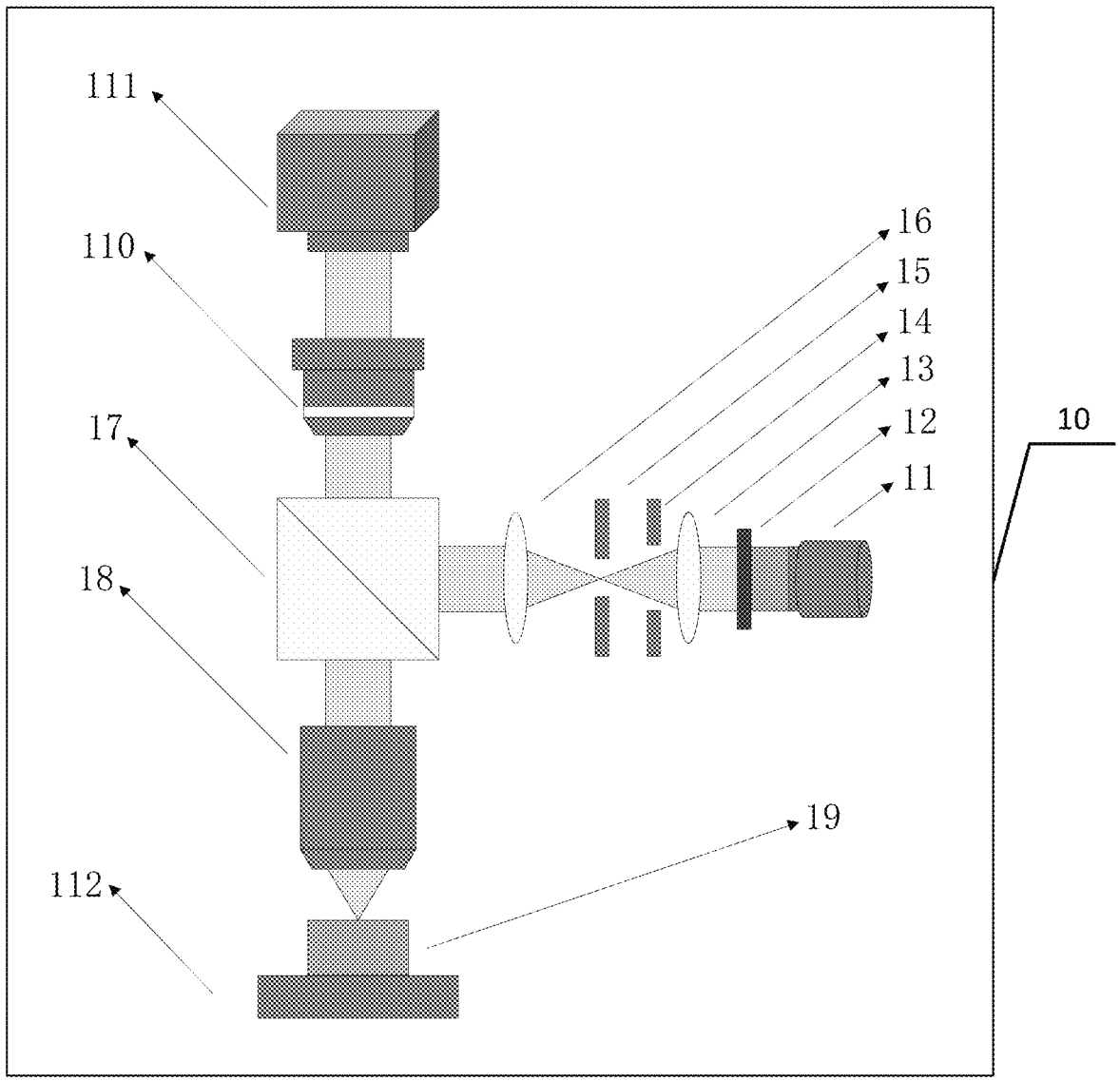
FIG. 2 is a schematic structural diagram of an embodiment of an optical path system provided by the present invention.

In an embodiment, as shown in FIG. 2, the optical path system 10 includes a white light source 11, a filter 12, a first lens 13, a field diaphragm 14, an aperture diaphragm 15, a second lens 16 and a beam splitter 17 arranged in sequence along the optical path. The optical path system 10 further includes a microscopic objective lens 18 and an electric displacement stage 112, the microscopic objective lens 18 is disposed between the beam splitter 17 and the electric displacement stage 112. The optical path system 10 further includes a tube lens 110 and a wavefront sensor 111. The tube lens 110 is disposed between the beam splitter 17 and the wavefront sensor 111. The sample under test is disposed on the electric displacement stage 112 and is disposed on the light output side of the microscope objective lens 18.

The principle of collecting the interference image of the sample under test by the optical path system 10 is: the white light source 11 is configured to generate an incident light source, which passes through the filter 12, the first lens 13, the field diaphragm 14, the aperture diaphragm 15 and the second lens 16, and a collimated monochromatic light source is generated after adjustment. The collimated monochromatic light source is reflected to the microscope objective lens 18 through the beam splitter 17 and then converged on the sample under test. The light irradiated on the sample under test is reflected again onto the microscope objective lens 18, and transmitted to the tube lens 110 for magnification and imaging on the wavefront sensor 111.

The electric displacement stage 112 is configured to drive the sample under test to move in the horizontal or vertical direction.

The interference image of the sample under test and the reference area refers to that the electric displacement stage 112 drives the sample under test to move in the horizontal direction to obtain the interference image of the sample under test and the reference area. The electric displacement stage 112 moves vertically for adjusting focus.

In S102, the normalized light intensity map and the optical path difference of the sample under test relative to the reference area are determined through the recovery algorithm based on the obtained interference image.

In S103, the measurement model is established based on the reflective film transmission matrix model.

Figure 3:
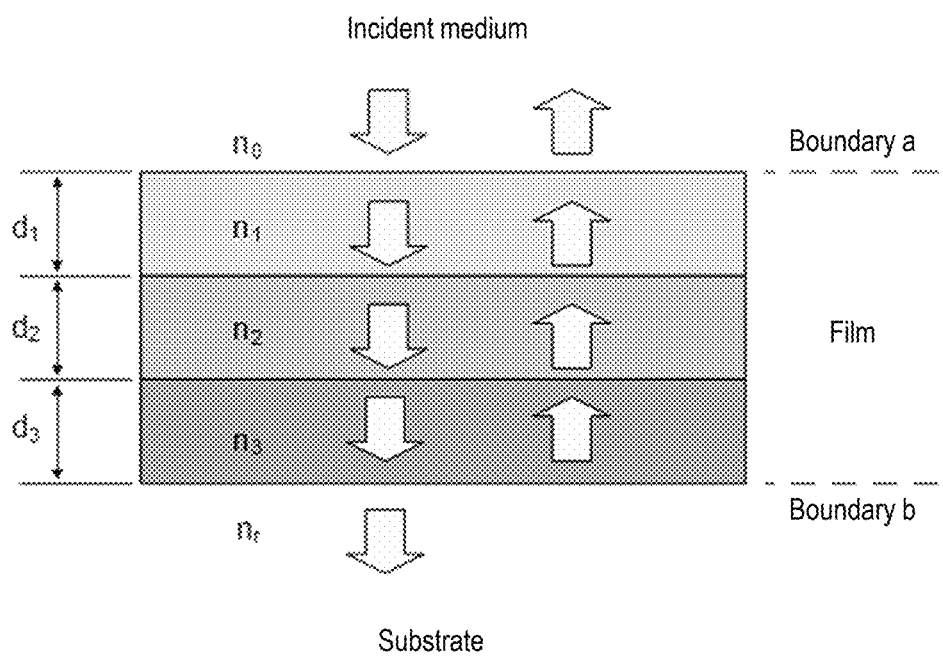
FIG. 3 is a schematic diagram of a reflective film transmission matrix model in S103 in FIG. 1.

As shown in FIG. 3, the boundary a and the boundary b represent the boundaries between the film and the incident medium and substrate respectively; as the incidence is vertical, the relationship between the electric field Ea at the boundary a, the magnetic field Ha and the electric field Eb at the boundary b is:

$$\begin{bmatrix} E_a/E_b \\ H_a/E_b \end{bmatrix} = \begin{bmatrix} B \\ C \end{bmatrix} = \left\{ \prod_{r=1}^{q} M_r \right\} \begin{bmatrix} 1 \\ \eta_m \end{bmatrix}$$

$$M_r = \begin{bmatrix} \cos\underline{\delta_r} & (i\sin\underline{\delta_r})/\underline{\eta_r} \\ i\underline{\eta_r}\sin\underline{\delta_r} & \cos\underline{\delta_r} \end{bmatrix}$$

$$\underline{\delta_r} = \frac{2\pi\underline{n_r}d_r}{\lambda}$$

$$\underline{\eta_r} = y_0\underline{n_r}$$

In the formula, $\underline{n_r}$, $y_0$ and $M_r$ respectively represent the complex refractive index, optical admittance and film-related characteristic matrix, q is provided to represent the number of layers of the film, and m represents the substrate.

The multi-layer film structure is regarded as a single-layer surface, and the admittance y may be obtained, which represents the ratio of the magnetic field and the electric field. The expression is:

$$y = \frac{C}{B}$$

Then the expression of the complex reflection coefficient is:

$$\underline{r} = \frac{\eta_0 - y}{\eta_0 + y}$$

In S104, the relationship between the measured ratio of reflection coefficient and optical path difference of the area under test of the sample under test relative to the reference area and the measurement model is determined. The formula corresponding to the above relationship is:

$$\frac{\underline{r}}{\underline{r_0}} = \sqrt{R}\, e^{-i\varphi},$$

In the formula, R and φ respectively represent the measured ratio of reflection coefficient and optical path difference of the area under test relative to the reference area, $\underline{r}$ is the complex reflectance of the area under test, and $\underline{r_0}$ is the complex reflectance of the taken reference area.

In S105, the complex refractive index distribution profile of the film under test is calculated based on the measured reflection coefficient and optical path difference of the area under test of the film relative to the reference area and the relationship.

In the obtaining method provided in the present invention, after obtaining the original phase and light intensity distribution, the present invention first obtains the initial complex refractive index distribution based on a model of the reflective film transmission matrix model, obtains the target complex refractive index distribution profile model, and then removes outliers in the model, thereby increasing the accuracy of the obtained target complex refractive index distribution, that is, it is possible to restore the complex refractive index distribution of the measured sample to the greatest extent.

Figure 4:
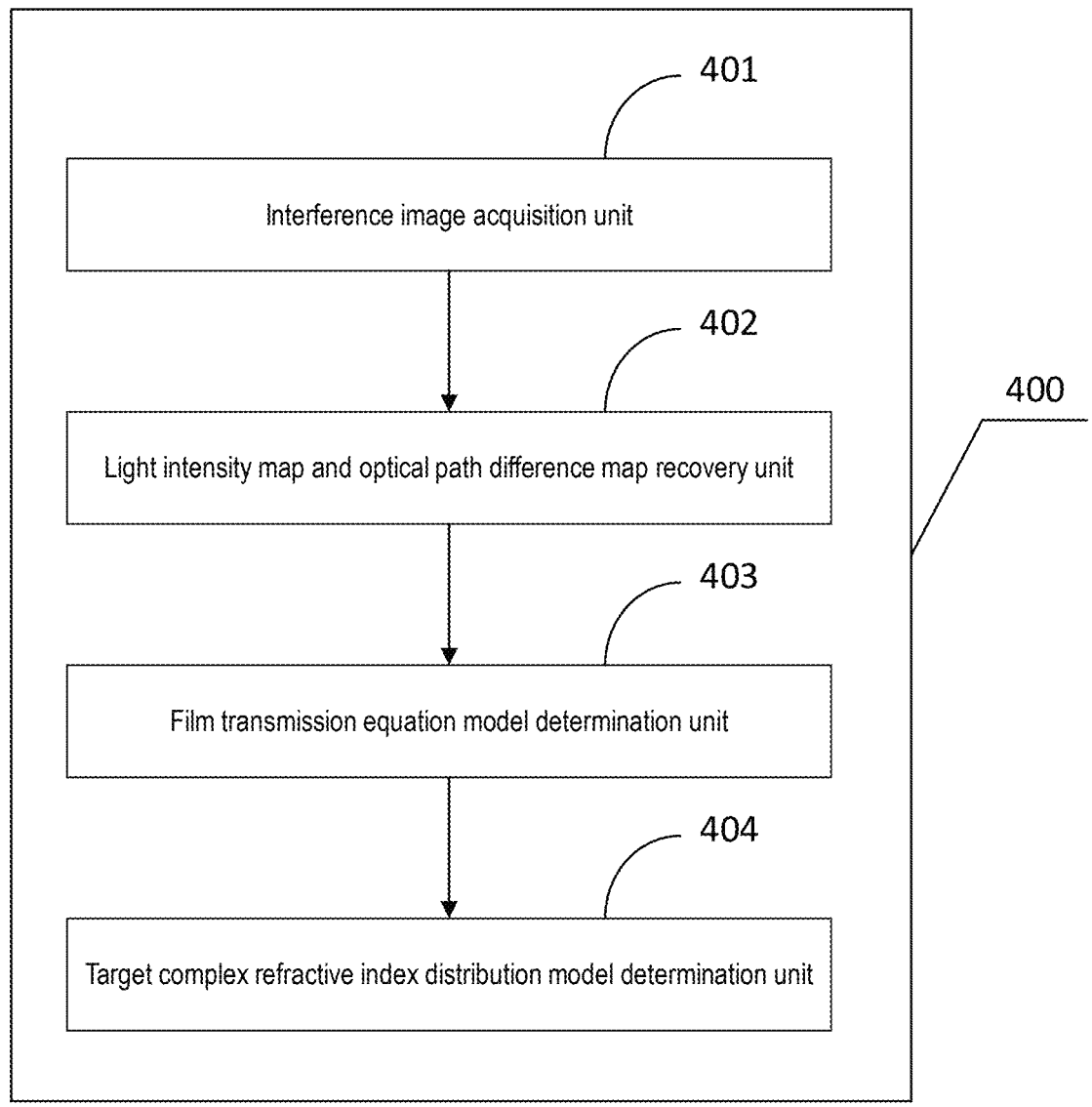
FIG. 4 is a schematic structural diagram of an embodiment of a film complex refractive index distribution profile determination device provided by the present invention.

In order to better implement the method of determining the complex refractive index distribution profile in the embodiment of the present invention, on basis of the method of determining the complex refractive index distribution profile, correspondingly, as shown in FIG. 4, the present invention further provides a complex refractive index distribution profile determination device 400. The device includes an interference image acquisition unit 401, a light intensity map and optical path difference map recovery unit 402, a film transmission matrix model determination unit 403, and a target complex refractive index distribution profile determination unit.

The interference image acquisition unit 401 is configured to collect the interference image of the sample under test, where the interference image includes the interference image of the area under test and the reference area. The interference image acquisition unit includes all interferometry methods that may simultaneously image the light intensity map and the optical path difference map, including but not limited to transverse shear interferometry, holography, and diffraction phase imaging.

The light intensity map and optical path difference map recovery unit 402 is configured to determine the normalized light intensity map and optical path difference map of the sample under test relative to the reference area based on the recovery algorithm.

The film transmission matrix model determination unit 403 is configured to analyze the film sample and determine the relationship between the light beam reflected by the film sample and the incident light beam.

The target complex refractive index distribution profile determination unit is configured to determine the initial value of the complex refractive index distribution profile based on the reflective film transmission matrix model and based on the relationship between the reflective film transmission matrix model and the measured result, and remove outliers to obtain the target complex refractive index distribution profile.

The device may implement the method for obtaining the complex refractive index distribution profile of a film. The specific principles of implementing each of the above units may be derived in the related description of the method for obtaining the complex refractive index distribution profile of a film, which will not be described again here.

Figure 5:
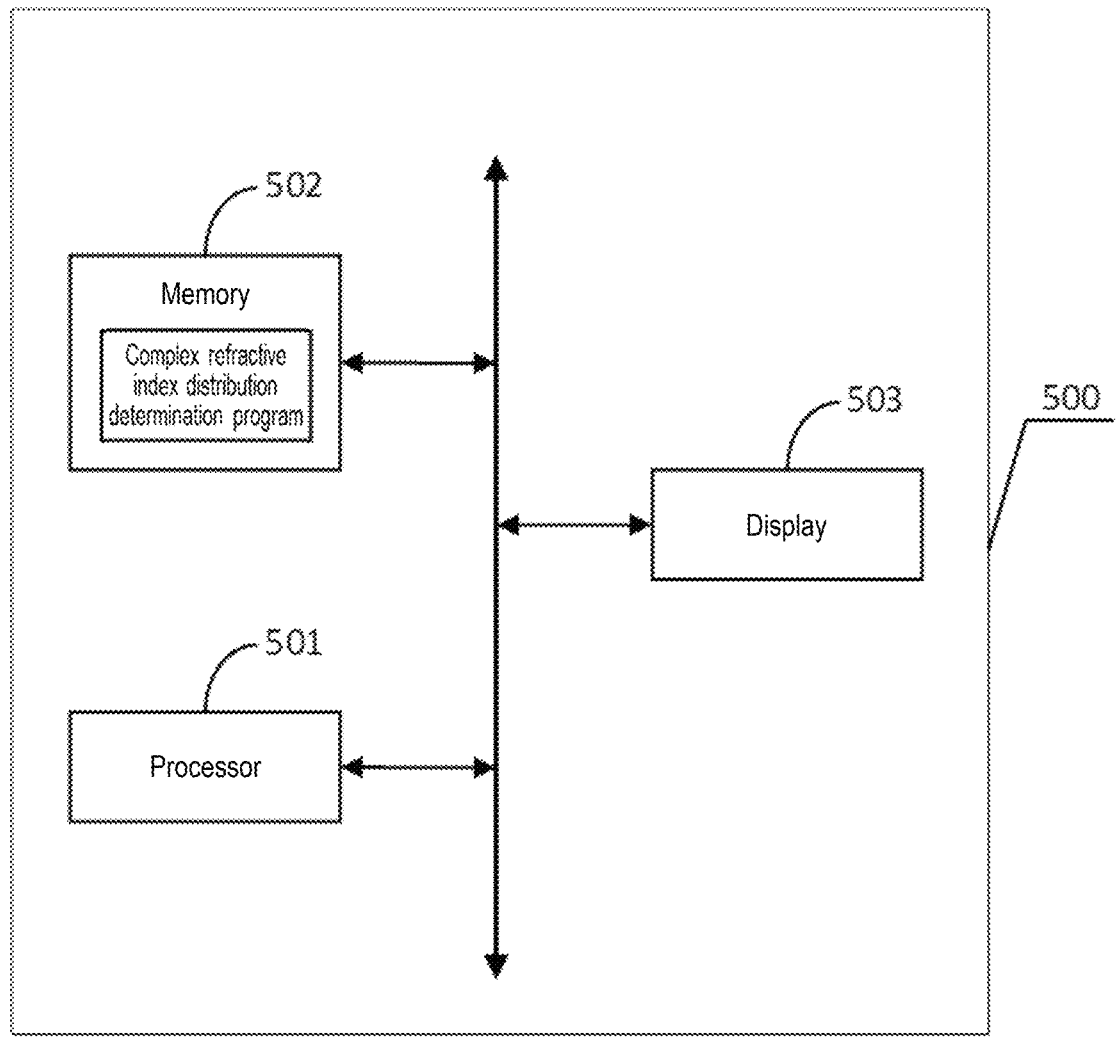
FIG. 5 is a schematic structural diagram of an embodiment of a film complex refractive index distribution profile measurement device provided by the present invention.

In another embodiment, please refer to FIG. 5, a complex refractive index distribution profile measurement device 500 is provided, and the device includes a processor 501, a memory 502 and a display 503. In some embodiments, the memory 502 may be an internal storage unit of the complex refractive index distribution profile measurement device 500, such as a hard disk or memory of the complex refractive index distribution profile measurement device. In other embodiments, the memory may also be an external storage device of the complex refractive index distribution profile measurement device, such as a plug-in hard disk, a smart media card (SMC), a secure digital (SD) card, a flash card and the like equipped on the complex refractive index distribution profile measurement device.

The memory may further include both an internal storage unit of the complex refractive index distribution profile measurement device and an external storage device. The memory is configured to store application software and various data for installing the complex refractive index distribution profile measurement device.

In some embodiments, the processor 501 may be a central processing unit (CPU), a microprocessor or other data processing chip, and configured to run program codes stored in the memory or process data, such as the method for determining the complex refractive index distribution profile in the present invention.

In some embodiments, the display 503 may be an LED display, a liquid crystal display, a touch-controlled liquid crystal display, a QLED (Organic Light-Emitting Diode) touch device, etc. The display is configured to display information on the complex refractive index distribution profile measurement device and to display a visual user interface. The components of the complex refractive index distribution profile measurement device communicate with each other via the system bus.

In some embodiments of the present invention, when the processor executes the complex refractive index distribution profile model determination program in the memory, the following steps may be implemented:

The interference image of the reference area and sample under test is collected;

The normalized light intensity map and optical path difference map of the sample under test relative to the reference area are determined based on the recovery algorithm;

The measurement model is established based on the reflective film transmission matrix model;

The relationship between the measured result and the measurement model is determined based on the reflective film transmission matrix model;

The complex refractive index distribution profile of the sample of film under test is determined based on the measurement result and the established model, and outliers are removed.

It should be understood that when the processor executes the complex refractive index distribution profile model determination program in the memory, in addition to the above functions, it is also possible to implement other functions. For details, please refer to the previous description of the corresponding method embodiment.

Furthermore, the embodiment of the present invention does not specifically limit the type of the complex refractive index distribution profile measurement device mentioned above. The complex refractive index distribution profile measurement device may be photovoltaic devices, semiconductor devices, optical devices and the like. Exemplary embodiments of the portable complex refractive index distribution profile measurement device include, but are not limited to, portable complex refractive index distribution profile measurement devices equipped with IOS, Android, Microsoft or other operating systems. The above-mentioned portable complex refractive index distribution profile measurement device may also be other portable complex refractive index distribution profile measurement devices, such as a laptop computer with a touch-sensitive surface (e.g., a touch panel). It should also be understood that in other embodiments of the present invention, the complex refractive index distribution profile measuring device may not be a portable complex refractive index distribution profile measuring device, but a desktop computer with a touch-sensitive surface (e.g., a touch panel).

Correspondingly, embodiments of the present invention further provide a computer-readable storage medium. The computer-readable storage medium is configured to store computer-readable programs or instructions. When the programs or instructions are executed by the processor, the method for obtaining the complex refractive index distribution profile of the film provided in the various method embodiments may be implemented.

In a method and system for obtaining a complex refractive index distribution profile of a film, the system includes a memory and a processor. The memory stores a computer program. When the processor executes the computer program, the method for obtaining the complex refractive index distribution profile of the film as described above is executed.

Those skilled in the art can understand that all or part of the process of implementing the methods of the above embodiments may be completed by instructing relevant hardware (such as processors, controllers, etc.) through a computer program, and the computer program may be stored in a computer-readable storage medium. The computer-readable storage medium is a magnetic disk, an optical disk, a read-only memory or a random access memory, etc.

It is easy for those skilled in the art to understand that the above descriptions are only preferred embodiments of the present invention and are not intended to limit the present invention. Any modifications, equivalent substitutions and improvements, etc., made within the spirit and principles of the present invention should all be included in the scope to be protected by the present invention.

What is claimed is:

1. A method for obtaining a complex refractive index distribution profile of a film, wherein the obtaining method comprises the following steps:

collecting an interference image of a reference area and a sample under test;

determining a normalized light intensity map and an optical path difference of a sample under test relative to the reference area through a recovery algorithm based on the obtained interference image;

establishing a measurement model based on a reflective film transmission matrix model;

determining a relationship between a measured reflection coefficient and an optical path difference of an area under test of the sample under test relative to the reference area and the measurement model;

calculating a complex refractive index distribution profile of a film under test based on the measured ratio of reflection coefficient and the optical path difference of the area under test of the film relative to the reference area and the relationship.

2. The method for obtaining the complex refractive index distribution profile of the film according to claim 1, wherein the method of collecting the interference image of the sample under test is to collect an image sequence of the sample under test in real time based on an optical path system, or to invoke from a storage medium that stores the image sequence of the sample under test collected based on the optical path system.

3. The method for obtaining the complex refractive index distribution profile of the film according to claim 2, wherein the optical path system comprises a white light source, a filter, a first lens, a field diaphragm, an aperture diaphragm, a second lens and a beam splitter arranged sequentially along an optical path, the optical path system further comprises a microscope objective lens and an electric displacement stage, the microscope objective lens is disposed between the beam splitter and the electric displacement stage; the optical path system further comprises a tube lens and a wavefront sensor, the tube lens is disposed between the beam splitter and the wavefront sensor.

4. The method for obtaining the complex refractive index distribution profile of the film according claim 3, wherein the electric displacement stage is configured to drive the sample under test to move in a horizontal or vertical direction.

5. The method for obtaining the complex refractive index distribution profile of the film according to claim 1, wherein a formula corresponding to the relationship is:

$$\frac{r}{r_0} = \sqrt{R}\, e^{-i\varphi},$$

wherein R and φ respectively represent the measured ratio of reflection coefficient and the optical path difference of the area under test relative to the reference area, $\underline{r}$ is the complex reflectance of the area under test, and $\underline{r_0}$ is a complex reflectance of the taken reference area.

6. The method for obtaining the complex refractive index distribution profile of the film according to claim 5, wherein a boundary a and a boundary b represent boundaries between the film and an incident medium and a substrate respectively; as an incidence is vertical, a relationship between an electric field Ea at the boundary a, a magnetic field Ha and an electric field Eb at the boundary b is:

$$\begin{bmatrix} E_a/E_b \\ H_a/E_b \end{bmatrix} = \begin{bmatrix} B \\ C \end{bmatrix} = \left\{ \prod_{r=1}^{q} M_r \right\} \begin{bmatrix} 1 \\ \eta_m \end{bmatrix}$$

$$M_r = \begin{bmatrix} \cos\underline{\delta_r} & (i\sin\underline{\delta_r})/\underline{\eta_r} \\ i\underline{\eta_r}\sin\underline{\delta_r} & \cos\underline{\delta_r} \end{bmatrix}$$

$$\underline{\delta_r} = \frac{2\pi \underline{n_r} d_r}{\lambda}$$

$$\underline{\eta_r} = y_0 \underline{n_r}$$

wherein $\underline{n_r}$, $y_0$ and $M_r$ respectively represent the complex refractive index, an optical admittance and a film-related characteristic matrix, q is provided to represent the number of layers of the film, and m represents the substrate.

7. The method for obtaining the complex refractive index distribution profile of the film according to claim 6, wherein a multi-layer film structure is regarded as a single-layer surface, and an admittance y is obtained, which represents a ratio of the magnetic field and the electric field, an expression is:

$$y = \frac{C}{B}$$

then an expression of a complex reflection coefficient is:

$$\underline{r} = \frac{\eta_0 - y}{\eta_0 + y}.$$

8. A system for obtaining a complex refractive index distribution profile of a film, wherein the system comprises a memory and a processor, wherein the memory stores a computer program, when the processor executes the computer program, the method for obtaining the complex refractive index distribution profile of the film according to claim 1 is executed.

9. A non-transitory computer-readable storage medium, wherein the non-transitory computer-readable storage medium is configured to store computer-readable programs or instructions, wherein when the programs or the instructions are executed by a processor, the method for obtaining the complex refractive index distribution profile of the film according to claim 1 is implemented.

* * * * *